US012801975B2

(12) United States Patent
Venkatasubramaniam et al.

(10) Patent No.: US 12,801,975 B2
(45) Date of Patent: Nov. 17, 2026

(54) SYSTEMS AND METHODS FOR GENERATING DATA

(71) Applicant: Walmart Apollo, LLC, Bentonville, AR (US)

(72) Inventors: Gnanapriya Venkatasubramaniam, San Carlos, CA (US); Shivee Singh, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 1080 days.

(21) Appl. No.: 17/466,808

(22) Filed: Sep. 3, 2021

(65) Prior Publication Data

US 2022/0245514 A1 Aug. 4, 2022

Related U.S. Application Data

(60) Provisional application No. 63/143,162, filed on Jan. 29, 2021.

(51) Int. Cl.
*G06N 20/00* (2019.01)
*G06F 16/35* (2025.01)
(Continued)

(52) U.S. Cl.
CPC ............. *G06N 20/00* (2019.01); *G06F 16/35* (2019.01); *G06N 20/20* (2019.01); *G06Q 20/4016* (2013.01)

(58) Field of Classification Search
CPC ........ G06N 20/00; G06N 20/20; G06F 16/35; G06F 21/55; G06Q 20/4016
See application file for complete search history.

(56) References Cited

U.S. PATENT DOCUMENTS

| | | | |
|---|---|---|---|
| 10,567,402 | B1 | 2/2020 | Comeaux et al. |
| 10,826,889 | B2 | 11/2020 | Graham et al. |

(Continued)

FOREIGN PATENT DOCUMENTS

| | | |
|---|---|---|
| CN | 109409896 A | 3/2019 |
| CN | 110175850 A | 8/2019 |

(Continued)

OTHER PUBLICATIONS

Y. Dou et al., "Enhancing Graph Neural Network-based Fraud Detectors against Camouflaged Fraudsters," Conference on Information and Knowledge Management (CIKM '20), Oct. 19-23, 2020, Virtual Event, Ireland, 10 pages.

(Continued)

*Primary Examiner* — Haimei Jiang
*Assistant Examiner* — Skieler Alexander Kowalik
(74) *Attorney, Agent, or Firm* — Morgan, Lewis & Bockius LLP; Manita Rawat

(57) ABSTRACT

Systems and methods for training a machine learning model are disclosed. A new machine learning model for a new system is trained using portions of source data used to train a well-established machine learning model that solves a different but related problem compared to the new machine learning model. Features required to train the new machine learning model may be compared to features in data samples of the source data to determine the portion of source data that can be used as training data to train the new machine learning model. The training data may then be used to train the new machine learning model without requiring a large set of training data that is unavailable for the new system.

17 Claims, 6 Drawing Sheets

(51) Int. Cl.
*G06N 20/20* (2019.01)
*G06Q 20/40* (2012.01)

(56) References Cited

U.S. PATENT DOCUMENTS

| | | | |
|---|---|---|---|
| 10,878,388 B2 | 12/2020 | Wang et al. | |
| 11,037,236 B1 | 6/2021 | Ram et al. | |
| 11,049,109 B1 | 6/2021 | Kramme et al. | |
| 11,120,450 B1 * | 9/2021 | Buckingham | G06Q 20/40145 |
| 11,159,505 B1 | 10/2021 | Lester et al. | |
| 11,276,023 B1 | 3/2022 | Butler et al. | |
| 11,568,286 B2 * | 1/2023 | Nourian | G06N 5/045 |
| 2013/0054438 A1 | 2/2013 | Boding | |
| 2013/0142422 A1 * | 6/2013 | Takita | G06T 3/4053 382/159 |
| 2019/0122096 A1 * | 4/2019 | Husain | G06N 3/04 |
| 2019/0378010 A1 | 12/2019 | Morris et al. | |
| 2019/0378050 A1 | 12/2019 | Edkin et al. | |
| 2020/0126085 A1 | 4/2020 | Roche et al. | |
| 2020/0134628 A1 | 4/2020 | Jia et al. | |
| 2020/0167786 A1 | 5/2020 | Kursun | |
| 2020/0167798 A1 | 5/2020 | Lee et al. | |
| 2020/0193217 A1 * | 6/2020 | Shen | G06F 16/3347 |
| 2020/0242669 A1 | 7/2020 | Carroll et al. | |
| 2020/0311734 A1 | 10/2020 | Mardikar et al. | |
| 2020/0364676 A1 | 11/2020 | Manmohan et al. | |
| 2020/0380524 A1 * | 12/2020 | Li | G06N 20/00 |
| 2021/0065193 A1 | 3/2021 | Kang et al. | |
| 2021/0103574 A1 | 4/2021 | Belezko et al. | |
| 2021/0160247 A1 | 5/2021 | Gaddam et al. | |
| 2021/0174366 A1 | 6/2021 | Zeng et al. | |
| 2021/0334822 A1 | 10/2021 | Pati et al. | |
| 2021/0374754 A1 | 12/2021 | Pandian | |
| 2022/0150583 A1 * | 5/2022 | Chun | H04N 21/25883 |
| 2022/0180291 A1 * | 6/2022 | Abeykoon | G06Q 10/0631 |

FOREIGN PATENT DOCUMENTS

| | | | | |
|---|---|---|---|---|
| CN | 110633987 A | 12/2019 | | |
| CN | 111340107 A | 6/2020 | | |
| EP | 3528462 A1 * | 8/2019 | H04L 67/12 | |
| GB | 3528462 A1 * | 8/2019 | H04L 67/12 | |
| WO | 2020/040710 A2 | 2/2020 | | |
| WO | 2020/097277 A1 | 5/2020 | | |

OTHER PUBLICATIONS

A. Dal Pozzolo, et al., "Credit Card Fraud Detection: A Realistic Modeling and a Novel Learning Strategy," IEEE, Sep. 14, 2017, 14 pages.
Y. Labrou, et al., "Wireless Wallet," IEEE, Aug. 26, 2004, 10 pages.
C. Merz, "Classification and Regression by Combining Models," ProQuest Dissertations Publishing, 1998, 232 pages.
J. Mendes-Moreira et al., "Ensemble Approaches for Regression: A Survey," ACM Computing Surveys, vol. 45, No. 1, Article 10, Nov. 2012, 40 pages.
Nikita Shirodkar, et al., "Credit Card Fraud Detection Techniques—A Survey," 2020 International Conference on Emerging Trends in Information Technology and Engineering, IEEE, 2020, pp. 1-7.
Baruhupolage Kasun Perera, "A Class Imbalance Learning Approach to Fraud Detection in Online Advertising," A Thesis Presented to the Masdar Institute of Science and Technology in Partial Fulfillment of the Requirements for the Degree of Master of Science in Computing and Information Science, 2013, 95 pages.
Krishnapuram et al., "Cost-Sensitive Machine Learning," Chapman & Hall / CRC, 2011, p. 1-316.
Moser, "Fraud detection with cost-sensitive machine learning," Medium, Mar. 29, 2019, p. 1-22.
Weiss et al., "Cost-Sensitive Learning vs. Sampling: Which is Best for Handling Unbalanced Classes with Unequal Error Costs?" ResearchGate, Jan. 2007, p. 1-8.

* cited by examiner

SYSTEMS AND METHODS FOR GENERATING DATA

CROSS-REFERENCE TO RELATED APPLICATIONS

This application claims priority to U.S. Provisional Patent Application No. 63/143,162, filed on Jan. 29, 2021 and entitled "SYSTEMS AND METHODS FOR GENERATING DATA," which is hereby incorporated by reference in its entirety.

TECHNICAL FIELD

This application relates generally to generating training data and, more particularly, to generating training data to train a computing system, such as to train an untrained machine learning model based on features from a trained machine learning model.

BACKGROUND

Machine learning models (e.g., neural networks, deep neural networks, convolutional neural networks) are increasingly used to predict patterns in data. Historical data is used to train a machine learning model to then make predictions and/or decisions on new data acquired in real-time or near real-time by matching new data to the learned patterns (e.g., features). For example, in an e-commerce system, a machine learning model may be trained for fraud detection based on patterns learned using historical transactions by customers. However, when a system (e.g., service, application) may be first launched, there may not be enough historical data required to adequately trained a machine learning model. Transfer learning is the process of using features (e.g., patterns) learned while training another machine learning model to train a new machine learning model to solve a different but related problem. For example, data from a densely populated system with a large collection of historical data (e.g., training data) may be used (e.g., transferred) to train a machine learning model for a sparsely populated system (e.g., a new system). In current systems, new machine learning models for new systems are trained based on the limited data available at the time of the launch, with new iterations as new data becomes available during inference. However, such systems may be prone to errors, especially during the earlier stages of the launch of the new systems. Such errors may lead to loss of revenue, especially in fraud detection systems, when the machine learning model fails to detect a risky transaction, and allowing a fraudulent transaction to take place. None of the current systems or approaches provides a solution to accurately detect fraudulent transaction during earlier stages of a newly launched system.

Further, current systems and approaches fail to accurately determine cost of misclassification errors while predicting financial transactions. This can be attributed to the current machine learning models (e.g., algorithms) assuming the cost of all misclassifications to be equal. However, in fraud detection, cost of misclassification of a fraudulent transaction as a non-fraudulent transaction class (e.g., majority class) to a retailer may be much higher than the cost of a misclassification of a non-fraudulent transaction as a fraudulent transaction class (e.g., minority class).

SUMMARY

In various embodiments, a system including a memory having instructions stored thereon and a processor is disclosed. The processor is configured to read the instructions to receive first training data including one or more first features, and second training data including one or more second features. The processor further identifies one or more third features in the one or more second features based on an overlap between the one or more first features and the one or more second features. The one or more third features may include a subset of the one or more second features. The processor also generates third training data based on the second training data and the one or more of the third features.

In various embodiments, a non-transitory computer-readable medium having instructions stored thereon is disclosed. The instructions, when executed by a processor cause a device to perform operations including receiving first training data including one or more first features, and second training data including one or more second features. The operations further including identifying one or more third features in the one or more second features based on an overlap between the one or more first features and the one or more second features. The one or more third features may include a subset of the one or more second features. The operations also including generating third training data based on the second training data and the one or more of the third features.

In various embodiments, a method of generating training data to train a machine learning model. The method includes receiving first training data including one or more first features, and second training data including one or more second features. The method further includes identifying one or more third features in the one or more second features based on an overlap between the one or more first features and the one or more second features related to predetermined attributes for training the machine learning model. The one or more third features may include a subset of the one or more second features. The method also includes generating third training data based the second training data and the one or more of the third features.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
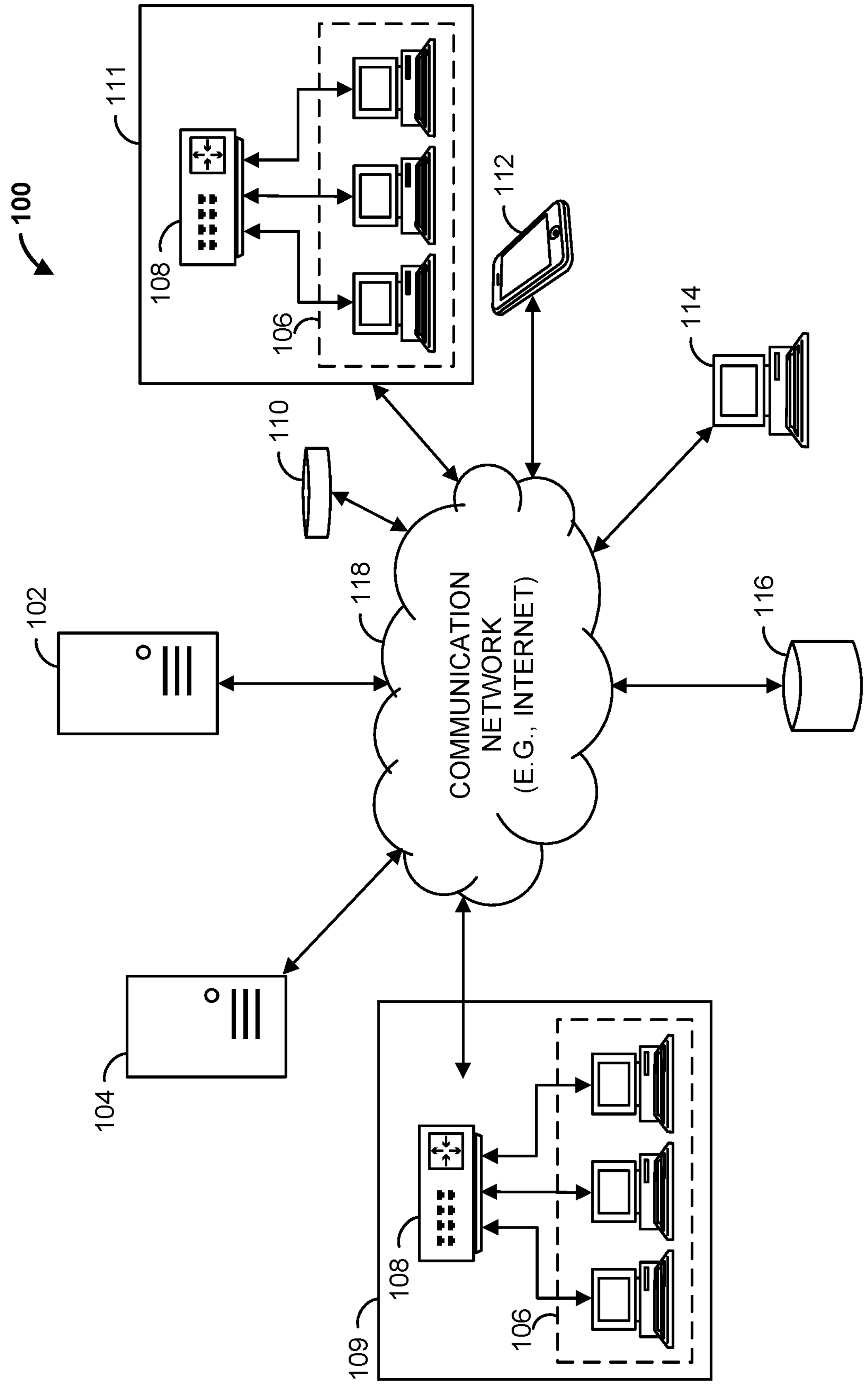
FIG. 1 is a block diagram of a training system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a training system 100 that includes a training data generation computing device 102 (e.g., a server, such as an application server), a web server 104, workstation(s) 106, database 116, and multiple customer computing devices 110, 112, 114 operatively coupled over network 118. Advertisement customization computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, training data generation computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, training data generation computing device 102 is operated by one or more entities training one or more machine learning models, and multiple customer computing devices 112, 114 are operated by customers of the entities.

Although FIG. 1 illustrates three customer computing devices 110, 112, 114, training system 100 can include any number of customer computing devices 110, 112, 114. Similarly, training system 100 can include any number of workstation(s) 106, training data generation computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with training data generation computing device 102 over communication network 118. The workstation(s) 106 may send data to, and receive data from, training data generation computing device 102. For example, the workstation(s) 106 may transmit data related to user interactions (e.g., transactions) to training data generation computing device 102. In response, training data generation computing device 102 may transmit an indication of one or more machine learning model results to the workstation(s) 106 in real-time.

In some examples, web server 104 may host one or more web pages, such as a retailer's or merchant's website. Web server 104 may transmit data related to user interactions and/or transactions on the website by a customer or user to training data generation computing device 102. In response, training data generation computing device 102 may use features of the training data to train a machine learning model. For example, the web server 104 may send user transaction data (e.g., historical data, payment instrument history, membership history, customer-store history, historical transactions, historical device information) from one webpage to the training data generation computing device 102 which may extract features related to fraud detection and use it to train the machine learning model to output fraud predictions on real-time transactions related to another web page. Training data generation computing device 102 may perform an overlap analysis on data (e.g., training data) received from the web server 104 and features required for training the machine learning model of the another webpage. The data samples in the received data that correspond to the required features may then be used as training data to train the machine learning model.

First customer computing device 110, second customer computing device 112, and Nth customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer or merchant that allows for the purchase of items. For example, the website may list prices for advertised items. An operator of one of multiple computing devices 110, 112, 114 may access the website hosted by web server 104, add one or more items to an online shopping cart of the web site, and perform an online checkout of the shopping cart to purchase the items for the listed prices.

Training data generation computing device 102 is operable to communicate with database 116 over communication network 118. For example, training data generation computing device 102 can store data to, and read data from, database 116. Database 116 can be a remote storage device, such as a cloud-based server, a memory device on another application server, a networked computer, or any other suitable remote storage. Although shown remote to training data generation correction computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Training data generation computing device 102 can generate training data for a machine learning model based on features of data used to train a different machine learning model used to solve a different but related problem. For example, training data generation computing device 102 may obtain source training dataset from database 116, the source training dataset may be related to a densely populated system (e.g., retailer's website, source retailer system). Database 116 may include data from a plurality of customers (e.g., users). The source training dataset may include observed labels for a set of source features. Training data generation computing device 102 may receive the source training dataset prior to generating a target training dataset to train a target machine learning model to predict fraudulent transactions. Training data generation computing device 102 may receive the source training dataset prior to using at least a portion of the training dataset for training the target machine learning model. The source training dataset may be sampled to generate or determine a target training dataset including data samples from the source training dataset corresponding to riskiness of entities (e.g., users, user devices, payment instruments). For example, source training dataset may include data samples related to a source retailer system (e.g., domain) and the target machine learning model may be trained to detect fraud risk for data transactions in a target retailer system. In an example, the source retailer system may use a source machine learning model to increase customer acquisition and/or revenue, and the target retailer system may use a target machine learning model to reduce losses due to fraudulent transactions. In some examples, source training data from multiple source retailer systems may be used to generate the target training data.

A transfer learning process (e.g., algorithm) may be used by training data generation computing device 102 to leverage the knowledge learned while training the source machine learning model to generate target training data to train the target machine learning model to solve a different but related problem. An overlap analysis maybe performed between source features in the source training dataset and target features required to train the target machine learning model of the target retailer system to predict fraudulent transaction. The data samples in the source training dataset that correspond to the overlapping features may then be used as target training data to train the target machine learning model. In some examples, the features may correspond to attributes that correspond to risk associated with a user, device, and/or payment instrument (e.g., debit card, credit card) indicating trustworthy customer, trustworthy device, trustworthy instrument, untrustworthy (e.g., risky) customer, untrustworthy device, and/or untrustworthy instrument. The data samples may then be used as training data to train the target machine learning model to predict fraudulent transaction in real-time or near real-time.

Further, a cost-sensitive loss function may be used by training data generation computing device 102 to train the target machine learning model to apply different costs for different misclassification errors. Because in fraud detection problem, cost of misclassifying a fraudulent transaction as a non-fraudulent transaction class (e.g., majority class) to a retailer is much higher than the cost misclassifying a non-fraudulent transaction as a fraudulent transaction class (e.g., minority class), a cost-sensitive algorithm (e.g., function) may be used as a loss function. The cost-sensitive loss function may be determined such that the function takes into account operational costs, customer friction cost, chargeback costs, and lost revenue costs for each different type of misclassification error (e.g., false positive prediction, false negative prediction). For example, cost associated with a false negative prediction (e.g., misclassification of a fraudulent transaction as non-fraudulent) in the cost function may be based on (e.g., function of) cost of the chargeback amount that the retailer may have to pay the bank associated with the transaction. Similarly, cost associated with a false positive prediction (e.g., misclassification of a non-fraudulent transaction as fraudulent) in the cost function may be based on customer dissatisfaction and/or operational costs. For example, customer dissatisfaction may be determined or estimated based on customer survey feedback and/or lost revenue from the corresponding customer not buying a product(s) (e.g., item(s)) from the retailer during the transaction as a result of a denied transaction. Operational cost may be related to false item checks involving a store associate (e.g., worker) to perform an item check at the retailer's store, such as associate's time and less associates available for helping other customers. The total cost for each customer may be accumulated per misclassified data sample in the target training dataset and fed into the cost-sensitive loss function to train the target machine learning model to accurately predict fraudulent transactions.

Training data generation computing device 102 may then train the machine learning model (e.g., target machine learning mode) associated with the target retailer system using the data samples (e.g., target training dataset) and the generated cost-sensitive loss function to predict fraudulent transactions. The trained machine learning model may be deployed in the target retailer system to accurately and efficiently predict fraudulent transactions in real-time as new data is received from or at the target retail system. The output(s) of the trained machine learning model may then be used by training data generation computing device 102 to perform operations, such as but not limited to, allowing or declining (e.g., blocking) transactions based on the new data sample(s) receiving in real-time or near real-time.

Generating Training Data for New Retailer System

In some examples, training data generation computing device 102 may generate training data to train a machine learning model (e.g., neural network, convolutional neural network, deep neural network) for a new retailer system based on a portion of data samples from a dataset used to train another machine learning model(s) related to a different retailer system. Transfer learning process may store knowledge acquired while solving one problem and applying it to a different but related problem. For example, knowledge acquired during training a machine learning model to increase customer acquisition (e.g., increasing revenue) may be stored and applied to train another machine learning model to determine risk assessment with transactions. Source dataset may include data samples associated with historical transaction related to the corresponding source retail system.

In some examples, each source retail system may be associated with one or more trained machine learning model (s) specific to that system (e.g., domain). Each trained machine learning model(s) may have been trained using source training dataset. Each source training dataset may include a set of source features (e.g., variable) that are used to train the corresponding trained machine learning model. The source features may be used by the training data generation computing device 102 to extract knowledge relevant to the target machine learning model corresponding to the target retail system. For example, the knowledge may be related to financial risk associated with entities (e.g., customers, devices, instruments) of the source retail system In some examples, a transfer learning process may be used to determine (e.g., identify, generate) the target training data.

In some examples, source retail system(s) may be selected based on a comparison of the problem solved by the source machine learning model(s) and the target machine learning model. An overlap analysis may be performed to determine common features between the source retail system(s) and the target retail system. The common features may be related to trustworthy customer, trustworthy device, trustworthy transaction device (e.g., credit card, debit card), untrustworthy customer, untrustworthy device, untrustworthy transaction instrument, etc. associated with historical transactions. In some examples, training data generation computing device 102 may generate a dataset of historical transactions in the source retail system(s) based on consumer identifications, and/or device identifications. Devices and/or customers with high risk (e.g., high velocity risky behavior) may be labeled as risky. In some examples, a portion of the source features may be identified as being relevant to the target retailer system by performing an overlap analysis between customer and/or devices of the source retail system(s) and the target retail system with high risk labels. In some examples, customers of the target retailer system may be searched for in the source training dataset(s) to identify customers with high risk. The portions of the source training dataset corresponding to customers of the target retailer system may be used as target training data to train the target machine learning model.

In some examples, the target features to compare to the source features may include a set of multi-dimensional customer-device pair and transaction specific features that indicate riskiness of each historical transaction. In some examples, the set of features for each historical transaction to consider its riskiness may include one or more of device fingerprinting features (e.g., retailer-user native device history, third-party fingerprinting results), transaction specific features (e.g., value of the specific transaction, riskiness associated with items in the transaction), customer-store historical features (e.g., frequency of customer visits to the store, frequency and monetary value of each transaction made by the customer in the store, proximity of the customer to the store), historical customer behavioral features (e.g., customer purchase pattern across retailer systems, customer purchase pattern in retailer stores (e.g., voided item frequency, bad item scans such as ticket switching), customer chargeback history due to fraudulent transactions), customer payment instrument historical features (e.g., number of times the payment instruments has been used by the customer, value of the transactions paid using the instrument, payment instrument-customer device history), and membership history (e.g., length of retail membership owned by the customer, membership status (etc., trial membership, full membership, partial membership, VIP membership), number and value of items brought during membership period).

The portions of the source training dataset(s) may be extracted that correspond to the target features in target training data. The portions may include data samples of the source training dataset that include the target features or features similar to the target features. In some examples, all data samples may be used with only labels corresponding to the target features included in the target training dataset. In other examples, only a portion of the source training dataset that includes at least one of the target features may be included in the target training dataset. The target training dataset may then be used to train the target machine learning model to predict fraudulent transaction for new data received from the target retail system (e.g., inference data for transaction made using the target retail system).

Cost-Sensitive Loss Function Determination

In some examples, a cost-sensitive loss function may be used by training data generation computing device 102 to train the target machine learning model to apply different costs for different misclassification errors. In fraud detection problems, cost of misclassifying a fraudulent transaction as a non-fraudulent transaction class (e.g., majority class) to a retailer is much higher than the cost misclassifying a non-fraudulent transaction as a fraudulent transaction class (e.g., minority class). As such, training data generation computing device 102 may use a cost-sensitive algorithm (e.g., function) as a loss function. The cost-sensitive loss function may be determined such that the function takes into account operational costs, customer friction cost, chargeback costs, and/or lost revenue costs for each different type of misclassification error (e.g., false positive prediction, false negative prediction). For example, false positive predictions are directly related to customer dissatisfaction, operational costs and loss of revenue, and false negative predictions of fraudulent transactions are directly related to costs assumed by the retailer. Since the number of fraudulent transactions encountered by the target retail system is much smaller than the number of trustworthy transactions, the cost of the target machine learning model missing fraudulent transaction may be much higher than the cost of incorrectly classifying a data sample related to a trustworthy transaction. Cost-sensitive loss function may take this imbalance into account while training the machine learning model.

The cost-sensitive loss function may be used to update parameters of the target machine learning model. The cost-sensitive loss function may be a function of the true label (e.g., trustworthy, fraudulent), of the data sample of the target training dataset, predicted value (e.g., probability of fraudulent transaction in the data sample), and the associated costs. For every training data sample, the cost-sensitive loss function may then be updated to then updated parameters of the target machine learning model.

Costs for the cost-sensitive loss function may be determined based on weighted costs of false negative predictions and false positive predictions accumulated for each misclassified data samples (e.g., total number of historical transactions in the target training data). The costs may be accumulated per data sample in the target training dataset. For example, the accumulated costs may be calculated for the loss function as follows:

$$\text{costs}=\Sigma_i(C_{FP_i}*FP_i+C_{FN_{(i)}}*FN_i+C_{TP}*TP_i+C_{TN}*TN_i) \quad \text{eq. 1}$$

where i indicates the total number of transactions, $C_{FP_1}$ indicates a predetermined weight associated with a false positive prediction, $FP_i$ represents a number of false positive predictions in the corresponding transaction, $C_{FN_{(i)}}$ represents cost of a false negative prediction for the transaction based on the chargeback amount for the missed fraud, $FN_i$ represents the false negative prediction in the transaction (e.g., 1 for every fast negative transaction), $C_{TP}$ represents the cost for a true positive prediction, $TP_i$ represents the total number of true positive predictions, $C_{TN}$ represents the cost for a true negative prediction, and $TN_i$ represents the number of true negative predictions in the transaction.

In some examples, the predetermined cost for the false positive prediction may be calculated based on customer dissatisfaction estimated based on customer survey feedback and lost revenue from the customer not purchasing the items. In some examples, the cost for the false positive predictions may also be determined based on operational costs associated with a retail worker having to perform an item check at the retail store, which is related to the worker's time and less workers available for helping other customers. In some examples, the cost for false positives may also be separately determined for each of the customer dissatisfaction and the operation cost.

In some examples, the cost for each false negative prediction may be based on chargeback amount associated with the particular missed fraudulent transaction. For each true positive and true negative prediction, the cost of true positive and cost of true negative may be zero. The total cost for each transaction for each customer may be accumulated per misclassified data sample in the second training dataset and fed into the cost-sensitive loss function to train the second machine learning model to accurately predict fraudulent transactions.

Figure 2:
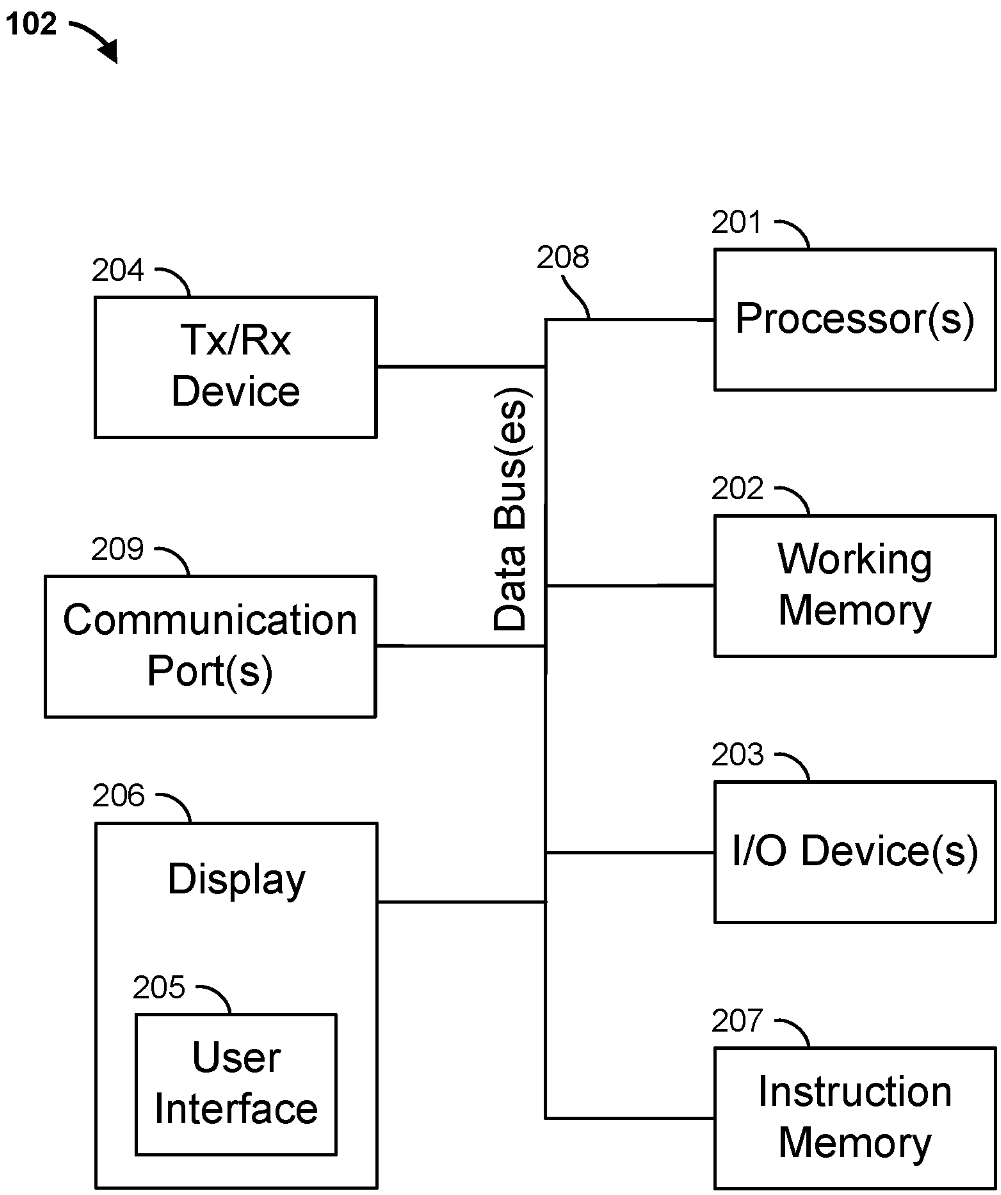
FIG. 2 is a block diagram of training data generation computing device of training system of FIG. 1 in accordance with some embodiments.

Referring now to FIG. 2, FIG. 2 illustrates the training data generation computing device 102 of FIG. 1. Training data generation computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of training data generation computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with training data generation computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 and training data generation computing device 102 will be operating in. Processor(s) 201 is operable to receive data from, or send data to, a network, such as communication network 118 of FIG. 1, via transceiver 204.

Figure 3:
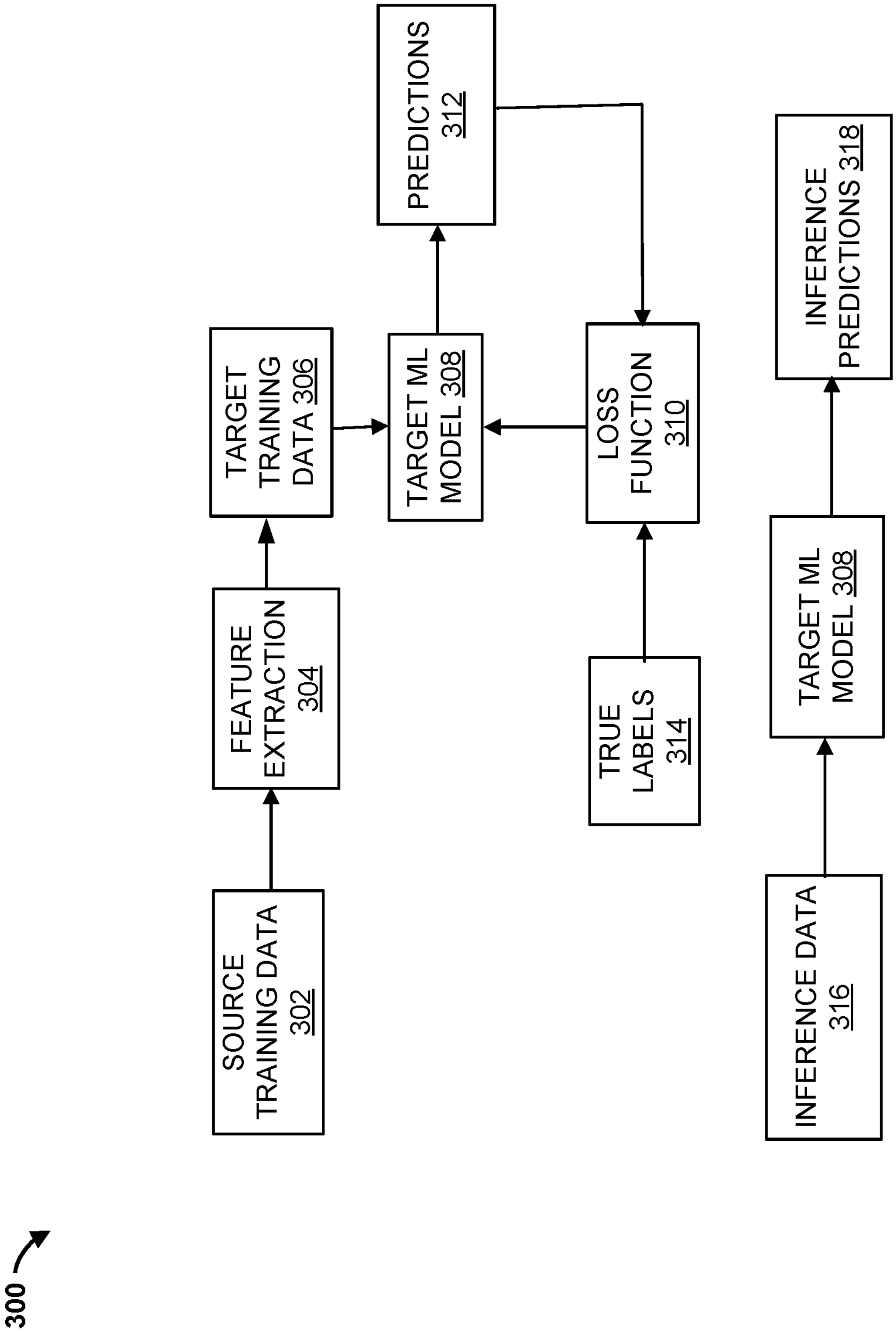
FIG. 3 is an example process flow illustrating a process of training a machine learning model using the training system of FIG. 1 in accordance with some embodiments.

FIG. 3 is an example process flow illustrating a process 300 of training a machine learning model using the training system of FIG. 1 in accordance with some embodiments. The process flow 300 illustrates how the training system 100 can leverage knowledge acquired while training a source machine learning model to train a target machine learning model 308. Feature extraction 304 may be used to perform an overlap analysis to extract data samples in the source training data 302 that include source features corresponding to target features required to train the target machine learning model 304. Target training data 306 may be generated using a portion of the source training data 302 including data samples including the source features matching the target features.

The process 300 then applies the target training data 306 to the target machine learning model 308 to output predictions 312 for each data sample in the target training data 306. The predictions 312 may include probabilities for each data sample including fraudulent transactions. Target machine learning model 308 may be trained using the target training data 306 and loss function 310. Loss function 310 may be a cost-sensitive loss function to take into account costs related to different misclassification errors. The cost-sensitive loss function may be updated with every data sample applied to the target machine learning model 308 using the predictions 312 and corresponding true labels 314. Costs may be determined for each data sample based on a cost formula calculating costs for each false positive and false negative predictions in predictions 312. The costs for every transaction in the target training data 306 may be aggregated and fed into the loss function 310 with weighted false negative and false positive costs while training the target machine learning model 308.

The target machine learning model 308 may then be deployed to detect fraudulent transactions in real-time or near real-time. Inference data 316 may be received from target retail system and applied to the trained target machine learning model 308. The target machine learning model 308 may output inference predictions 318 predicting a possibility of fraud in the inference data (i.e., real-time transaction data). The inference predictions 312 may be used to perform operations, such as but not limited to, blocking or accepting the transactions.

As can be appreciated, the process 300 is a simplified illustration of the processing that occurs to arrive at the trained target machine learning model 308. In other examples, the process 300 can include other steps or other sub-processes in addition to, or in other sequences, from the one illustrated. As can also be appreciated, the process 300 or the elements thereof can be repeated multiple times during a single interaction between a user and a personal agent, network-enabled tool, retailer's website or online store.

Figure 4:
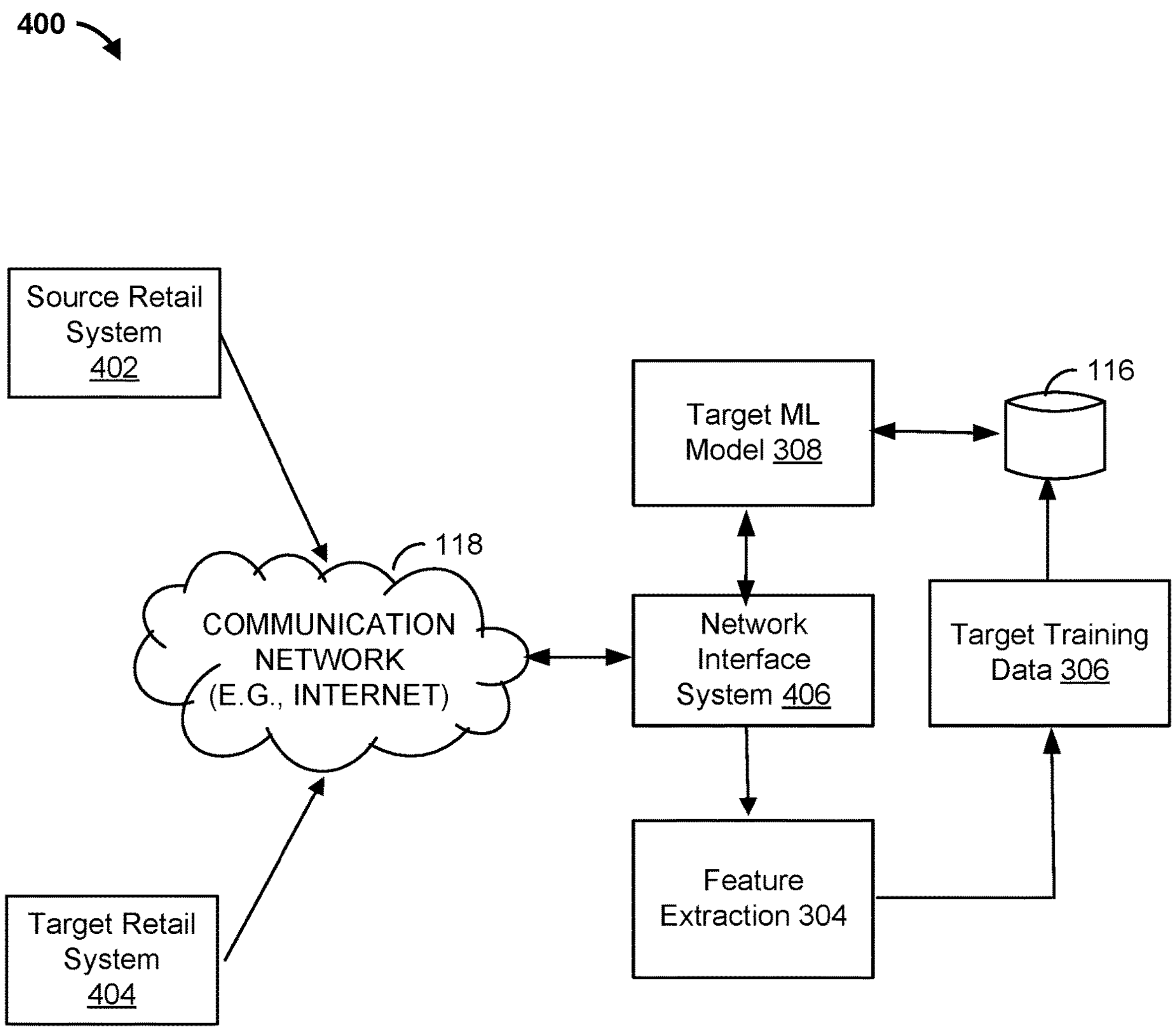
FIG. 4 illustrates a networked environment configured to provide a unified training data generation platform of training system of FIG. 1 in accordance with some embodiments.

Turning to FIG. 4, FIG. 4 illustrates a networked environment 400 configured to provide a unified training data generation platform, in accordance with some embodiments. The networked environment 40 may include, but is not limited to, one or more source retail systems 402, a target retail system 404, at least one network interface system 406, at least one feature extraction system 408 and at least one model training system 412. Each of the retail systems 402 and 404, network interface system 406, feature extraction system 408, and/or the model training system 412 may include a system as described above with respect to FIG. 1. Although embodiments are illustrated having a discrete systems, it will be appreciated that one or more of the illustrated systems may be combined into a single system configured to implement the functionality and/or services of each of the combined systems. For example, although embodiments are illustrated and discussed herein including each of a network interface system 406, a feature extraction system 408, and a model training system 412, it will be appreciated that these systems may be combined into a single logical and/or physical system configured to perform the functions and/or provide services associated with each of the individual systems.

In some embodiments, a network environment or platform may be provided to the one or more source retail systems 402, and target retail system 404 by the network interface system 406. The network platform may include separate network interfaces for each of the source retail system and target retail system, such as, for example, an interface accessible through one or more browsers, applications, or other interfaces. For example, in some embodiments, the network platform is a collection of retail platforms. Each of the source retail system 402 and target retail system 404 may be associated with one or more third-parties users of the network platform. For example, in embodiments including retail platforms, each of the source retail system 402 and target retail system 404 may be associated with a separate retail platform that offers goods and/or services for sale through the retailer interfaces.

In some embodiments network 118 may obtain transaction data regarding customers from source retail system 402. The historical transaction data related to the source retail system 402 may include source features that may have been used to train a source machine learning model to output predictions related to the source retail system 402. The source training data may include data corresponding to customer transactions with the source retail system 402, including, such as but not limited to, customer identifications, associated devices, payment instruments, risk assessments, etc. The source retail system 402 may provide to the network interface system 404 the source training data via the network 118.

In some embodiments, target retail system 404 may include target data associated with transactions made within the target retail system 404. Target retail system 404 may also be associated target features required to train a target machine learning model to predict fraudulent transactions made using interface associated with the target retail system 404. Target retail system 404 may provide the target data and the target features to the network interface system 406 for analysis via network 118.

Network interface system 406 may perform an overlap analysis to determine common features between the target features and the source features in the source training data. The common features may be related to trustworthy customer, trustworthy device, trustworthy transaction device (e.g., credit card, debit card), untrustworthy customer, untrustworthy device, untrustworthy transaction instrument, etc. associated with historical transactions in the training data. In some examples, a portion of the source features may be identified as being relevant to the target retailer system 404 by performing an overlap analysis between customer and/or devices of the source retail system 404 and the target retail system 404 with high risk labels. In some examples, customers of the target retailer system 404 may be searched for in the source training dataset to identify customers with high risk. The portions of the source training dataset corresponding to customers of the target retailer system 404 may be used as target training data 410 to train the target machine learning model.

In some examples, the target features to compare to the source features may include a set of multi-dimensional customer-device pair and transaction specific features that indicate riskiness of each historical transaction. In some examples, the set of features for each historical transaction to consider its riskiness may include one or more of device fingerprinting features (e.g., retailer-user native device history, third-party fingerprinting results), transaction specific features (e.g., value of the specific transaction, riskiness associated with items in the transaction), customer-store historical features (e.g., frequency of customer visits to the store, frequency and monetary value of each transaction made by the customer in the store, proximity of the customer to the store), historical customer behavioral features (e.g., customer purchase pattern across retailer systems, customer purchase pattern in retailer stores (e.g., voided item frequency, bad item scans such as picket switching), customer chargeback history due to fraudulent transactions), customer payment instrument historical features (e.g., number of times the payment instruments has been used by the customer, value of the transactions paid using the instrument, payment instrument-customer device history), and membership history (e.g., length of retail membership owned by the customer, membership status (etc., trail membership, full membership, partial membership, VIP membership), number and value of items brought during membership period).

The portions of the source training dataset(s) may be extracted that correspond to the target features. The portions may include data samples of the source training dataset that include the target features or features similar to the target features. In some examples, all data samples may be used with only labels corresponding to the target features included in the target training dataset. In other examples, only a portion of the source training dataset that includes at least one of the target features may be included in the target training dataset 410. The target training dataset 410 may then be used by the model training system 412 to train the target machine learning model to predict fraudulent transactions in new data received from the target retail system 404 (e.g., inference data for transaction made using the target retail system).

The model training system 412 may receive the target training dataset 410 from database 116 where the target training dataset 410 is stored. Model training system 412 may take as input the target training dataset 410 to predict, for each data sample of the target training dataset 410, a probability that the data sample (e.g., transaction) is a fraudulent transaction. Model training system 412 may further use a cost-sensitive loss function to fine tune the target machine learning model so that the costs are based on different misclassification errors in order for the target machine learning model to output fraudulent predictions more accurately and efficiently. The cost-sensitive loss function may be a function of training predictions for the data samples, true label of the data samples, and costs generated for each transaction. The cost-sensitive loss function may be further used to update parameters of the target machine learning model while training. The trained target machine learning model may be then be provided to the network interface system 406 to use to generate outputs based on target data received by the target retail system 404 in real-time or near-real time. In some examples, the model training system 412 may update the target machine learning model as more target data becomes available.

Although embodiments are discussed herein including retail platforms, it will be appreciated that the systems and methods disclosed herein are applicable to any system and/or environment that allows third-party participants to act in traditional "first-party" roles. Example environments include, but are not limited to, e-commerce platforms, service environments (e.g., technical assistance, medical assistance, etc.), software-as-a-service environments, server environments, digital environments, and/or any other suitable environment or system.

Figure 5:
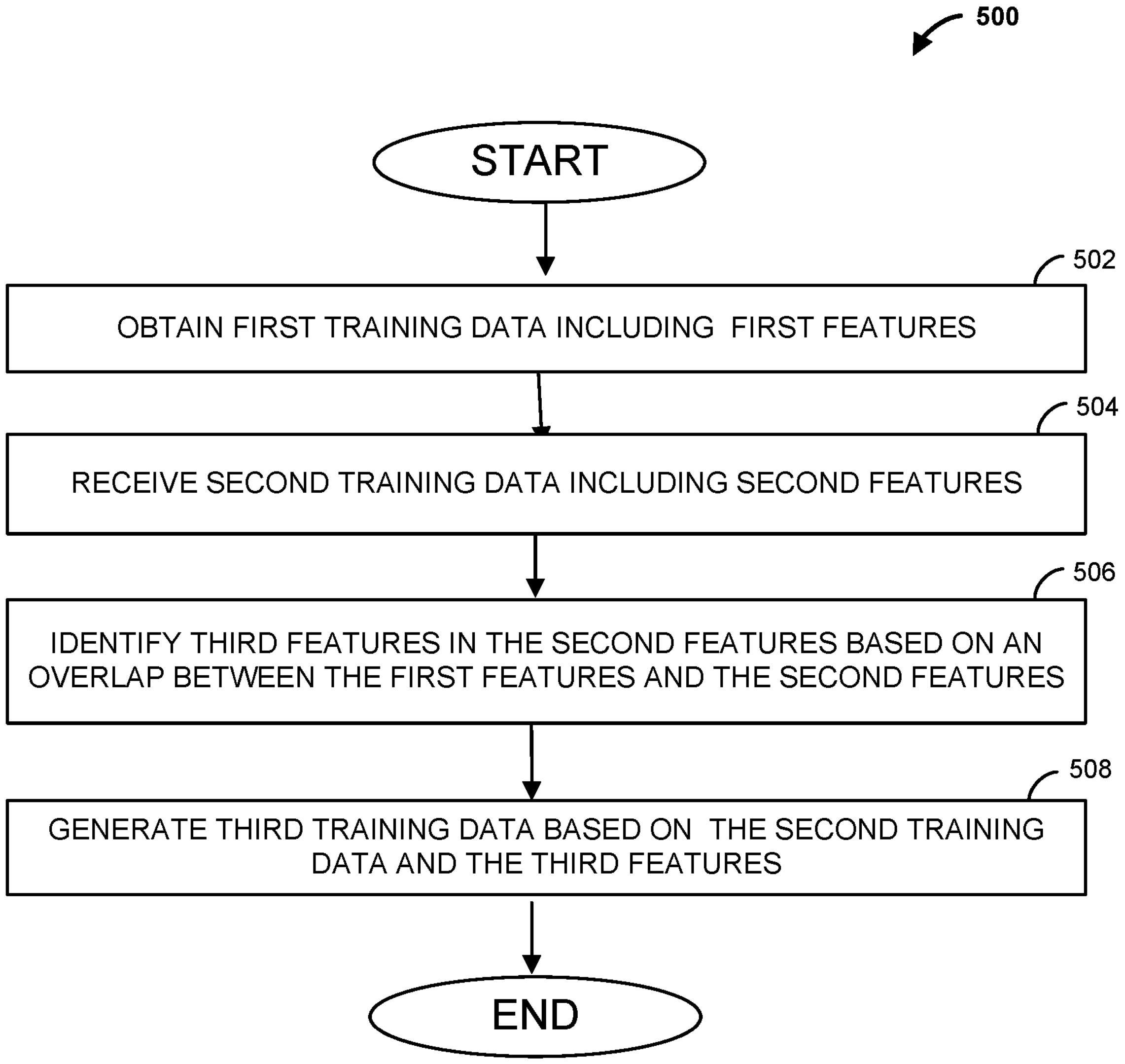
FIG. 5 is a flowchart of an example method that can be carried out by the training system of FIG. 1 in accordance with some embodiments.

Referring now to FIG. 5, an example method 500 for training a machine learning model by leveraging knowledge acquired from another machine learning model is illustrated. The method begins at step 502 when the training system 100 obtains first training data including one more first features. For example, training data generation computing device 102 may obtain target training data (small amount) including target features. Training data generation computing device 102 may receive second training data including one or more second features at step 504. For example, training data generation computing device 102 may receive source training data 302 from database 166. Source training data 302 may include source features used to train the source machine learning model.

At step 506, one or more third features in the one or more second features may be identified based on an overlap between the one or more first features and the one or more second feature. For example, overlap analysis may be performed by training data generation computing device 102 to find features in the source features matching the target features needed to train the target machine learning model.

At step 508, third training data may be generated based the second training data and the one or more third features. For example, target training data 306 may be generated based on feature extraction 304. Target training data 306 may include portions of the source training data including data samples including source features matching the target features. As shown, the method 500 ends following step 508.

Figure 6:
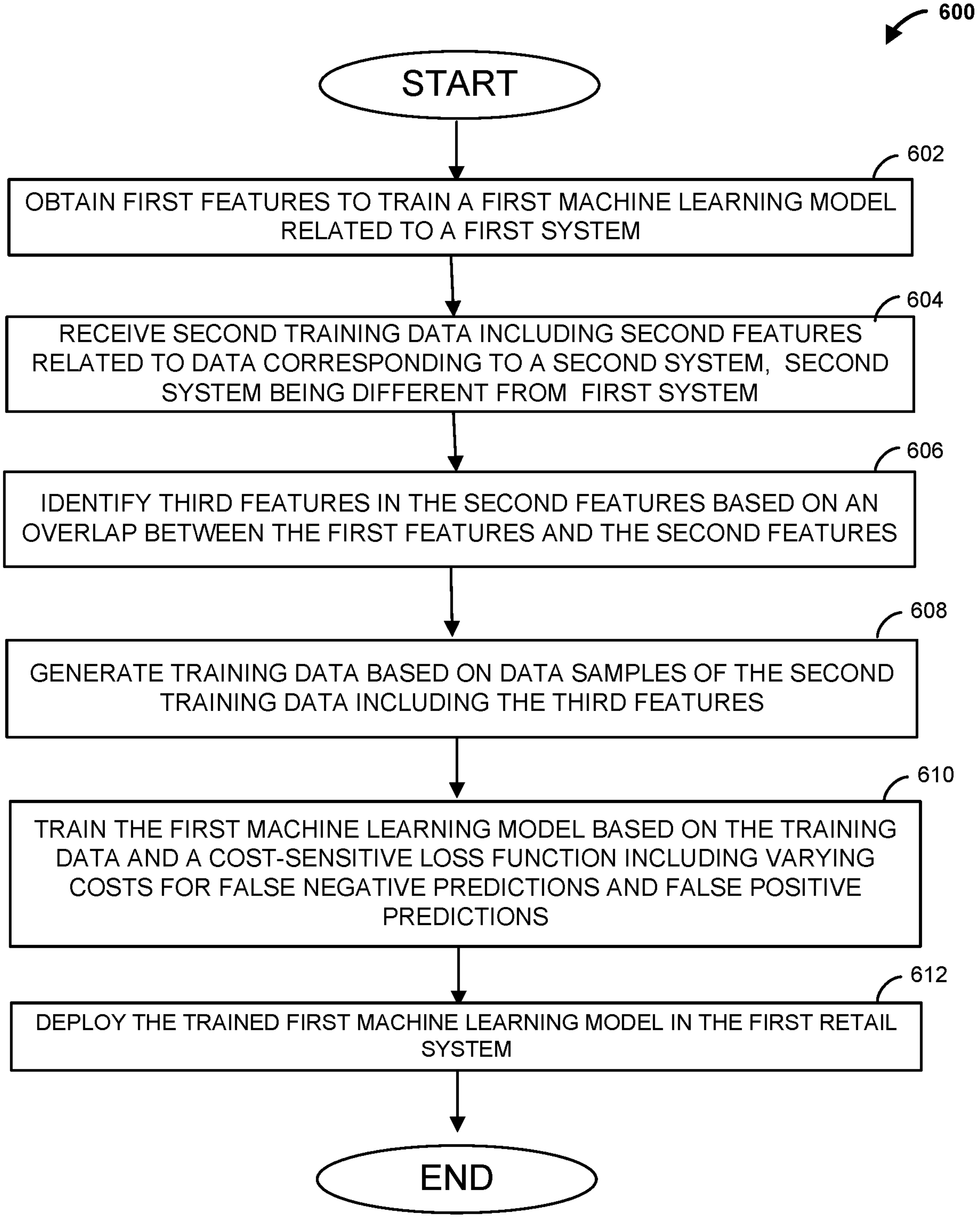
FIG. 6 is a flowchart of another example method that can be carried out by the training system of FIG. 1 in accordance with some embodiments.

FIG. 6 illustrates another example method 600 of the present disclosure. Example method 600 illustrates another method of training a machine learning model by leveraging knowledge acquired from another machine learning model. The method begins at step 602, when the training system 100 obtains first features to train a first machine learning model related to a first system. For example, training data generation computing device 102 may obtain target features to train the target machine learning model related to the target retail system 404. Training data generation computing device 102 may receive second training data including second features related to data corresponding to a second system at step 604, the second system being different from the first system. For example, training data generation computing device 102 may receive source training data 302 from database 166. Source training data 302 may include source features related to data corresponding to the source retail system 402. The source retail system 402 is different from the target retail system 404.

At step 606, third features in the second features may be identified based on an overlap analysis between the first features and the second feature. For example, overlap analysis may be performed by training data generation computing device 102 to find features in the source features matching the target features needed to train the target machine learning model. At step 608, training data may be generated based on data samples of the second training data including the third features. For example, target training data 306 may be generated based on feature extraction 304. Target training data 306 may include portions of the source training data including data samples including source features matching the target features.

At step 610, the first machine learning model may be trained based on the training data and a cost-sensitive loss function including varying cost for false negative predictions and false positive predictions. For example, target machine learning model 308 may be trained based on the target training data 306 and loss function 310 including a cost-sensitive loss function based on costs related to false negative and false positive predictions (see eq. 1). The trained first machine learning model is deployed in the first retail system at step 612. For example, trained machine learning model 308 may be deployed to receive inference data 316 and output inference predictions 318. As shown, the method 600 ends following step 512.

While not shown in FIGS. 5 and 6, the training data generation computing device 102 can continuously update the target training data and the target machine learning model as the target machine learning model continuously learns due to the increased data that is available to the target machine learning model once the target machine learning model is actively used to generate predictions on data received from target retail system. As such, training process may be continuously used to update the target machine learning model.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a generalpurpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:

a computing device including one or more processors configured to:

obtain, over a network, first training data associated with a first machine learning model related to a first system, the first training data including one or more first features;

receive, over the network, second training data associated with a second machine learning model related to a second system different from the first system, the second training data including one or more second features;

iteratively apply the one or more first features of the first training data and the one or more second features of the second training data set to an overlap analysis, and in response generate a third training data having a plurality of data samples by extracting an overlap portion of the second training data based on an overlap between the one or more first features and the one or more second features;

execute the first machine learning model to iteratively apply each of the data samples of the third training data over the network to generate a plurality of predictions, wherein each prediction of the plurality of predictions corresponds to the respective data sample of the third training data;

iteratively apply each prediction of the plurality of predictions to a cost-sensitive loss function to generate a weighted misclassification cost corresponding to each prediction of the plurality of predictions, wherein the weighted misclassification cost is based on a retail operational cost, a customer friction cost, a chargeback cost, or a lost revenue cost, wherein the weighted misclassification cost varies based on a type of misclassification, such that the weighted misclassification cost is lower for a false positive misclassification than for a false negative misclassification detected when training a third system using the third training data, wherein t the weighted misclassification cost for the false positive misclassification is based on the customer friction cost, the retail operational cost, or the lost revenue cost, and the weighted misclassification cost for the false negative misclassification is based on a retailer cost; and execute the first machine learning model to iteratively apply each of the data samples of the third training data and the weighted misclassification cost corresponding to each prediction of the plurality of predictions over the network to train the first machine learning model.

2. The system of claim 1, wherein the computing device is further configured to: compare the one or more second features to the one or more first features to match at least a subset of the one or more second features to at least a subset of the one or more first features; and based on comparing the one or more second features to the one or more first features, identify one or more third features, the one or more third features including the subset of the one or more second features that match the subset of the one or more first features.

3. The system of claim 2, wherein the computing device is further configured to: train a first system, associated with the first training data, using the third training data, wherein the one or more third features include the subset of the one or more second features, the subset of the one or more second features are related to fraud detection.

4. The system of claim 1, wherein the second training data includes data samples based on historical transaction data associated with a plurality of customers, each data sample includes observed labels for at least one of the one or more second features, each observed label corresponding to a second feature of the one or more second features.

5. The system of claim 4, wherein the third training data includes each data sample of the plurality of data samples with a subset of the observed labels corresponding to one or more third features.

6. The system of claim 4, wherein the third training data includes a subset of the plurality of data samples that include at least one label corresponding to one of one or more third features.

7. The system of claim 1, wherein the one or more first features include a set of multi-dimensional customer-device pairs, each multi-dimensional customer-device pair associated with a set of transaction specific features that indicate riskiness of a corresponding historical transaction within the first training data.

8. The system of claim 1, wherein the second training data is more densely populated than the first training data such that the second training data has more data samples than the first training data.

9. A method comprising: obtaining, over a network, first training data associated with a first machine learning model related to a first system, the first training data including one or more first features; receiving, over the network, second training data associated with a second machine learning model related to a second system different from the first system, the second training data including one or more second features; iteratively applying the one or more first features of the first training data and the one or more second features of the second training data set to an overlap analysis, and in response generating a third training data having a plurality of data samples by extracting an overlap portion of the second training data based on an overlap between the one or more first features and the one or more second features; executing the first machine learning model to iteratively apply each of the data samples of the third training data over the network to generate a plurality of predictions, wherein each prediction of the plurality of predictions corresponds to the respective data sample of the third training data; iteratively apply each prediction of the plurality of predictions to a cost-sensitive loss function to generate a weighted misclassification cost corresponding to each prediction of the plurality of predictions, wherein the weighted misclassification cost is based on a retail operational cost, a customer friction cost, a chargeback cost, or a lost revenue cost, wherein the weighted misclassification cost varies based on a type of misclassification, such that the weighted misclassification cost is lower for a false positive misclassification than for a false negative misclassification detected when training a third system using the third training data, wherein t the weighted misclassification cost for the false positive misclassification is based on the customer friction cost, the retail operational cost, or the lost revenue cost, and the weighted misclassification cost for the false negative misclassification is based on a retailer cost; and executing the first machine learning model to iteratively apply each of the data samples of the third training data and the weighted misclassification cost corresponding to each prediction of the plurality of predictions over the network to train the first machine learning model.

10. The method of claim 9, the method further comprising: comparing the one or more second features to the one or more first features to match at least a subset of the one or more second features to at least a subset of the one or more first features; and based on comparing the one or more second features to the one or more first features, identifying one or more third features, the one or more third features including the subset of the one or more second features that match the subset of the one or more first features.

11. The method of claim 10, the method further comprising: training a first system, associated with the first training data, using the third training data, wherein the one or more third features include the subset of the one or more second features, the subset of the one or more second features are related to fraud detection.

12. The method of claim 9, wherein the second training data includes data samples based on historical transaction data associated with a plurality of customers, each data sample includes observed labels for at least one of the one or more second features, each observed label corresponding to a second feature of the one or more second features.

13. The method of claim 12, wherein the third training data includes each data sample of the plurality of data samples with a subset of the observed labels corresponding to one or more third features.

14. The method of claim 12, wherein the third training data includes a subset of the plurality of data samples that include at least one observed label corresponding to one of one or more third features.

15. A non-transitory computer readable medium having instructions stored thereon, wherein the instructions, when executed by at least one processor, cause a device to perform operations comprising: obtaining, over a network, first training data associated with a first machine learning model related to a first system, the first training data including one or more first features;

receiving, over the network, second training data associated with a second machine learning model related to a second system different from the first system, the second training data including one or more second features; iteratively applying the one or more first features of the first training data and the one or more second features of the second training data set to an overlap analysis, and in response generating a third training data having a plurality of data samples by extracting an overlap portion of the second training data based on an overlap between the one or more first features and the one or more second features; executing the first machine learning model to iteratively apply each of the data samples of the third training data over the network to generate a plurality of predictions, wherein each prediction of the plurality of predictions corresponds to the respective data sample of the third training data; iteratively apply each prediction of the plurality of predictions to a cost-sensitive loss function to generate a weighted misclassification cost corresponding to each prediction of the plurality of predictions, wherein the weighted misclassification cost is based on a retail operational cost, a customer friction cost, a chargeback cost, or a lost revenue cost, wherein the weighted misclassification cost varies based on a type of misclassification, such that the weighted misclassification cost is lower for a false positive misclassification than for a false negative misclassification detected when training a third system using the third training data, wherein t the weighted misclassification cost for the false positive misclassification is based on the customer friction cost, the retail operational cost, or the lost revenue cost, and the weighted misclassification cost for the false negative misclassification is based on a retailer cost; and executing the first machine learning model to iteratively apply each of the data samples of the third training data and the weighted misclassification cost corresponding to each prediction of the plurality of predictions over the network to train the first machine learning model.

16. The non-transitory computer readable medium of claim 15, the operations further comprising: comparing the one or more second features to the one or more first features to match at least a subset of the one or more second features to at least a subset of the one or more first features; and based on comparing the one or more second features to the one or more first features, identifying one or more third features, the one or more third features including the subset of the one or more second features that match the subset of the one or more first features.

17. The non-transitory computer readable medium of claim 15, wherein the second training data includes data samples based on historical transaction data associated with a plurality of customers, each data sample includes observed labels for at least one of the one or more second features, each observed label corresponding to a second feature of the one or more second features.

* * * * *